US008125430B2

(12) United States Patent
Shiratsuchi et al.

(10) Patent No.: US 8,125,430 B2
(45) Date of Patent: Feb. 28, 2012

(54) DISPLAY SYSTEM

(75) Inventors: Toshiharu Shiratsuchi, Nagoya (JP); Masami Kataoka, Anjo (JP); Shinji Tsuda, Okazaki (JP); Masashi Yamakawa, Kariya (JP)

(73) Assignee: Denso Corporation, Kariya (JP)

( * ) Notice: Subject to any disclaimer, the term of this patent is extended or adjusted under 35 U.S.C. 154(b) by 269 days.

(21) Appl. No.: 12/688,412

(22) Filed: Jan. 15, 2010

(65) Prior Publication Data
US 2010/0182354 A1 Jul. 22, 2010

(30) Foreign Application Priority Data

Jan. 16, 2009 (JP) ................................ 2009-008018

(51) Int. Cl.
*G09G 3/36* (2006.01)
(52) U.S. Cl. ......................................... 345/89; 345/102
(58) Field of Classification Search .................... 345/87, 345/89, 90, 98, 100, 102
See application file for complete search history.

(56) References Cited

U.S. PATENT DOCUMENTS 6,597,338 B2  7/2003  Onodera
2005/0231457 A1* 10/2005 Yamamoto et al. ........... 345/102
2007/0105069 A1  5/2007 Yamagishi
2009/0122207 A1*  5/2009 Inoue et al. .................... 348/739

FOREIGN PATENT DOCUMENTS

| JP | 2002-287686 | 10/2002 |
|----|-------------|---------|
| JP | 2007-91030  | 4/2007  |
| JP | 2008-158497 | 7/2008  |

OTHER PUBLICATIONS

Naoki Yokota et al., U.S. Appl. No. 12/507,920, filed Jul. 23, 2009.

* cited by examiner

*Primary Examiner* — Ricardo L Osorio
(74) *Attorney, Agent, or Firm* — Nixon & Vanderhye PC

(57) ABSTRACT

A display system that includes a liquid crystal element, a backlight, an adjustment unit, a light source control unit, and a liquid crystal control unit. The light source control unit operates the backlight to change a light source luminance level of light. The liquid crystal control unit operates a first plurality of pixels of the liquid crystal element to display normal information with a normal tone level. The liquid crystal control unit operates a second plurality of pixels of the liquid crystal element to display emphasis information with an emphasis tone level. When an adjustment value changes within a predetermined changeable range, the luminance level gradually changes with a change of the adjustment value, the normal tone level gradually changes with the change of the adjustment value, and simultaneously the emphasis tone level is maintained to correspond to brightness equal to or greater than brightness of the normal tone level.

6 Claims, 4 Drawing Sheets

DISPLAY SYSTEM

CROSS REFERENCE TO RELATED APPLICATION

This application is based on and incorporates herein by reference Japanese Patent Application No. 2009-8018 filed on Jan. 16, 2009.

BACKGROUND OF THE INVENTION

1. Field of the Invention

The present invention relates to a display system that has a display element having pixels, a tone of each of which is adjustable.

2. Description of Related Art

A conventional display system is known to have a transmissive display element and a backlight. The transmissive display element allows light to transmit therethrough and has pixels, a tone of each of which is adjustable. Also, the backlight provides light toward the display element from the rear side of the display element to thereby backlight the display element. A visible luminance of a screen of the above display system is determined by luminance of the backlight and a tone of the display element. JP-A-H11-194736 (corresponding to U.S. Pat. No. 6,597,338) and JP-A-2008-158497 describe liquid crystal display systems that provide a desired visible luminance by adjusting both of the luminance of the backlight and the tone of the display element.

Sometimes, a part of multiple information sets displayed on the display system is required to be emphasized by displaying the emphasis part with luminance higher than luminance, with which the other information is displayed. For example, the vehicular display system displays (a) normal information sets indicating a current operational state and (b) alert information sets indicating abnormal conditions or urgent conditions. Typically, the alert information sets are indicated by characters or patterns. In order to notify the user of the abnormal conditions or the urgent conditions, the display of the alert information sets is emphasized. For example, the normal information is associated with a vehicle speed and an engine rotational speed, and the alert information is associated with an overheat state. The alert information is displayed on one segment of the display system, and the one segment or pixels for displaying the alert information are displayed with high luminance for emphasizing the information.

Also, in the display system, the visibility of the information is adjusted based on the preference of the user or brightness of extraneous light. More specifically, the visible luminance on the display system is required to be adjusted based on the luminance determined by the user. When the above luminance adjustment is performed, the above emphasized display of the emphasis part is required to be also sufficiently achieved while the luminance is effectively adjusted.

For example, as described in a system of JP-A-2008-158497, a changeable range of the luminance determined by the user is divided into multiple modes, and the luminance of the backlight and the tone of the display element are adjusted for each of the modes. However, the system of JP-A-2008-158497 has a complicated display control disadvantageously.

SUMMARY OF THE INVENTION

The present invention is made in view of the above disadvantages. Thus, it is an objective of the present invention to address at least one of the above disadvantages.

To achieve the objective of the present invention, there is provided a display system that includes a liquid crystal element, a backlight, an adjustment unit, a light source control unit, and a liquid crystal control unit. The liquid crystal element has a plurality of pixels. A tone level of each of the plurality of pixels is adaptable. A first plurality of pixels of the plurality of pixels displays normal information. A second plurality of pixels of the plurality of pixels displays emphasis information. The backlight provides light toward the liquid crystal element, and a light source luminance level of light provided by the backlight is adjustable. The adjustment unit sets an adjustment value. The light source control unit operates the backlight to change the light source luminance level. The liquid crystal control unit operates the first plurality of pixels to display the normal information with the tone level of a normal tone level. The liquid crystal control unit operates the second plurality of pixels to display the emphasis information with the tone level of an emphasis tone level. When the adjustment value changes within an entirety of a predetermined changeable range of the adjustment value, the light source control unit operates the backlight such that the light source luminance level gradually changes with a change of the adjustment value. When the adjustment value changes within the entirety of the changeable range, the liquid crystal control unit operates the first and second plurality of pixels such that the normal tone level gradually changes with the change of the adjustment value and simultaneously the emphasis tone level is maintained to correspond to brightness equal to or greater than brightness provided by the normal tone level.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

Figure 1:
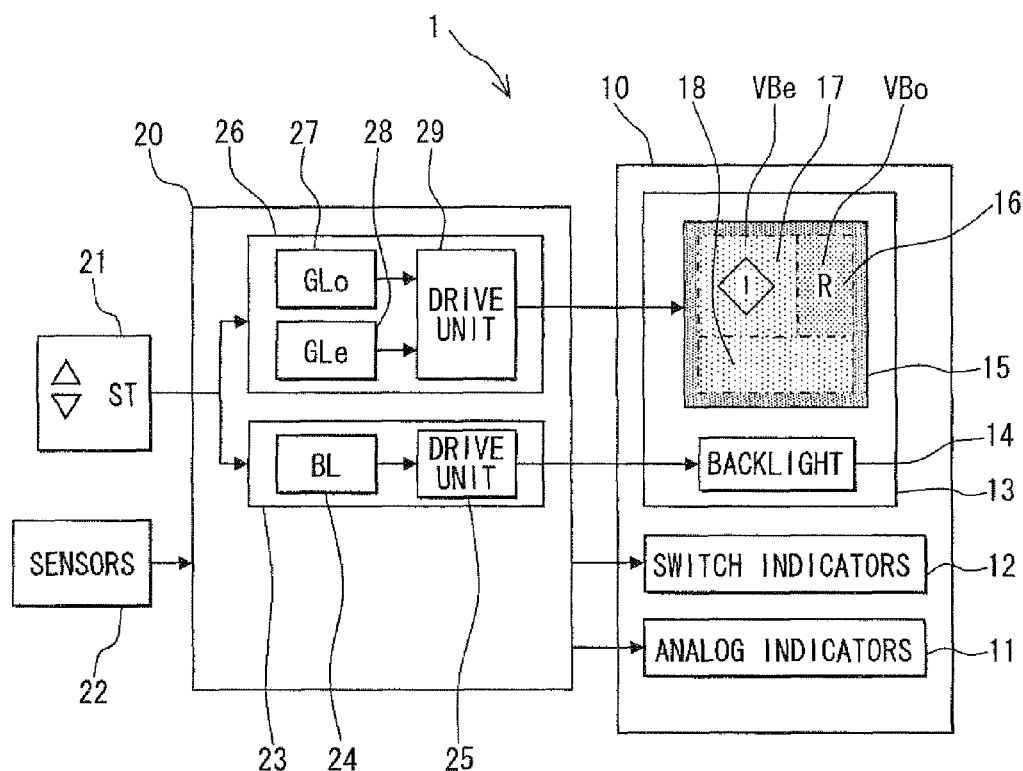
FIG. 1 is a block diagram illustrating a display system according to the first embodiment of the present invention.
Figure 2:
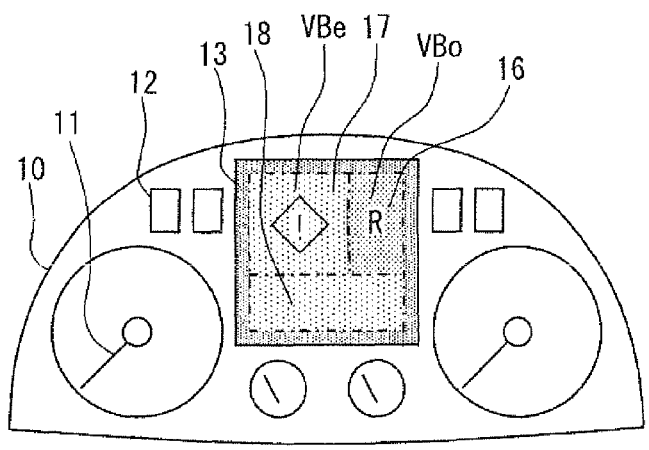
FIG. 2 is a plan view illustrating a screen of the display system of the first embodiment.
Figure 3:
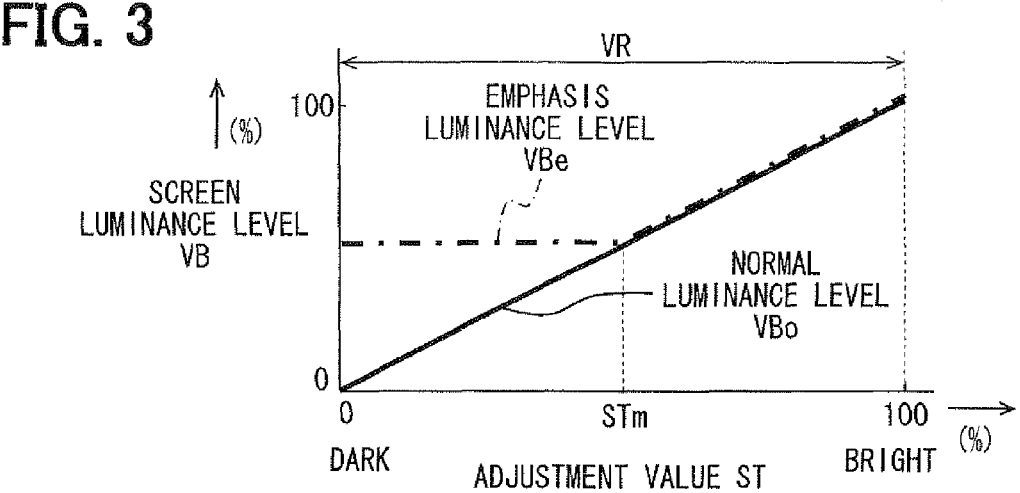
FIG. 3 is a chart illustrating a relation between a screen luminance level VB and an adjustment value ST in the first embodiment.
Figure 4:
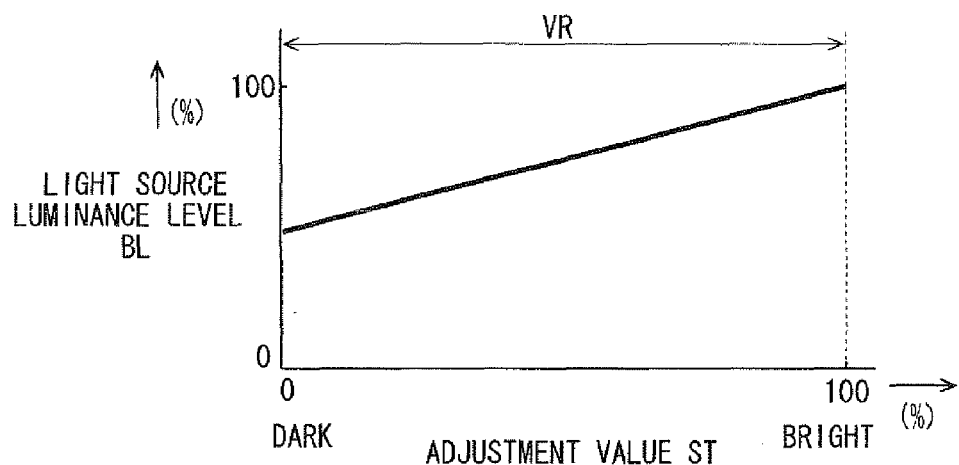
FIG. 4 is a chart illustrating a luminance characteristic between a light source luminance level BL and the adjustment value ST in the first embodiment.
Figure 5:
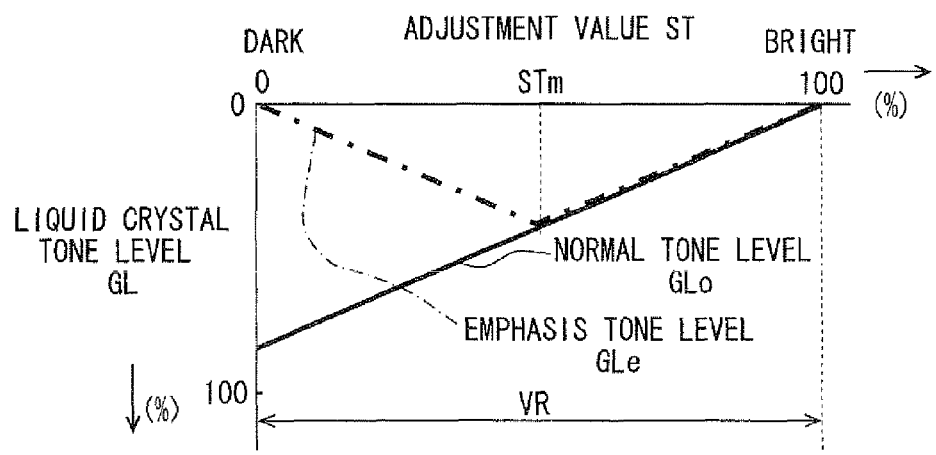
FIG. 5 is a chart illustrating a tone characteristic between a liquid crystal tone level GL and the adjustment value ST in the first embodiment.

The first embodiment of the present invention applied to a vehicular display system will be described below. FIG. 1 is a block diagram illustrating a vehicular display system 1. FIG. 2 is a plan view illustrating a screen of the display system 1. The vehicular display system 1 is provided in a front side of a vehicle compartment. FIG. 3 is a chart illustrating a relation between a screen luminance level VB and an adjustment value ST. FIG. 4 is a chart illustrating a luminance characteristic between a light source luminance level BL and the adjustment value ST. FIG. 5 is a chart illustrating a tone characteristic between a liquid crystal tone level GL and the adjustment value ST. It should be noted that the screen luminance level VB means a luminance level or a brightness level on a liquid crystal display (LCD) 13, which level is visible or visually recognized by a user. The screen luminance level VB is prepared by combination of a luminance level BL of a backlight 14 and a tone level of each pixel of a liquid crystal element 15. Thus prepared luminance level VB is visible on the screen of the liquid crystal display 13. More specifically, the luminance level BL of the backlight 14 is lowered by the degree accordingly to the tone level of each pixel of the liquid crystal element 15, and the lowered luminance level BL appears on the screen of the liquid crystal display 13, for example.

The vehicular display system 1 shows multiple vehicle information sets indicating a condition of the vehicle. The vehicle information sets include a travel speed, an engine rotational speed, a coolant temperature, a gear position, and a brake air pressure. Further, the vehicle information sets also include (a) alert information, which indicates an occurrence of an abnormal condition, and (b) specific information, such as operation assist information, which suggests an appropriate operation. The vehicle information sets are divided into (1) normal information, which is not required to be emphasized, and into (2) emphasis information, which is required to be emphasized due to its importance or urgency. For example, information indicating a normal operational state is categorized into normal information, and the alert information and the specific information are categorized into the emphasis information. For example, the gear position of a transmission of the vehicle may be categorized into the normal information. However, information indicating overheat, or information indicating that the brake air pressure is equal to or less than a predetermined value is categorized into the emphasis information. The vehicular display system 1 shows multiple vehicle information sets based on preset program. Furthermore, the display of the emphasis information is emphasized by using luminance higher than luminance used for displaying the normal information.

In FIGS. 1 and 2, the vehicular display system 1 includes a display unit 10 and a control unit 20. The display unit 10 includes multiple analog indicators 11. The analog indicators 11 indicate, for example, a vehicle speed, an engine rotational speed, a coolant temperature, and a residual amount of fuel. The display unit 10 further includes multiple switch indicators 12. The switch indicators 12 inform occurrences of predetermined events by switching between lighting on and lighting out. The switch indicators 12 inform shortage of fuel, an abnormal high temperature state of coolant, shortage of lubricant, an unfastened seat belt, and failure of on-vehicle device, for example. The display unit 10 includes the liquid crystal display 13. The liquid crystal display 13 includes the backlight 14 and the liquid crystal element 15 that serves as a display element. The backlight 14 serves as a light source having a cold-cathode tube or an LED. The backlight 14 provides light toward the liquid crystal element 15 from a rear side of the liquid crystal element 15 to thereby backlight the liquid crystal element 15. The liquid crystal element 15 is a TFT liquid crystal and displays thereon information, such as characters, diagrams, images, by using multiple pixels. The liquid crystal display 13 has a display area, which includes multiple segments 16, 17, 18. Each of the segments displays different vehicle information.

Pixels within the first segment 16 (first plurality of pixels) displays the normal information. For example, the pixels within the first segment 16 display a character "R" that indicates that the gear is in a rear position. The other pixels within the second segment 17 and the third segment 18 (second plurality of pixels) display emphasis information sets. For example, the display of the overheat is made by combination of a character and a pattern in the respective segment. In the above, the luminance, with which the information within the first segment 16 is displayed, is a normal luminance that is relatively dark. Also, the luminance, with which the information within the second segment 17 or the third segment 18 is displayed, is an emphasized luminance that is relatively bright.

The arrangement of the multiple segments 16, 17, 18 in the liquid crystal display 13 and the information displayed on the multiple segments 16, 17, 18 may be changeable in various manner. For example, when anything associated with the emphasis information occurs, the luminance for both of the second segment 17 and the third segment 18 may be set as the emphasized luminance. In contrast, when anything associated with the emphasis information does not occur, the second segment 17 may display the normal information, such as the fuel consumption, air pressure, by using the normal luminance. Also, the third segment 18 solely may display the information identical with the information indicated by the switch indicators 12 with the emphasized luminance. Further, all of the segments 16, 17, 18 may display the emphasis information with the emphasized luminance. Alternatively, all of the segments 16, 17, 18 may display the normal information with the normal luminance. It should be noted that the liquid crystal display 13 may selectively display information through the emphasized luminance and the normal luminance in accordance with the occurrence of the abnormal condition or in accordance with the request from the user.

The control unit 20 is an electronic control device that includes a microcomputer. The control unit 20 is connected with an adjustment unit 21 and multiple sensors 22. The adjustment unit 21 is provided within the passenger compartment and is operable by the user. The user is capable of setting a required screen luminance through the operation of the adjustment unit 21. The adjustment unit 21 outputs the adjustment value ST. The multiple sensors 22 include a speed sensor, an engine rotational speed sensor, a gear position sensor, and a coolant temperature sensor. The control unit 20 is connected to the display unit 10. The control unit 20 causes the analog indicators 11 to display the information obtained through the multiple sensors 22. Also, the control unit 20 changes the lighting on and out of the switch indicators 12 based on the information obtained through the multiple sensors 22. Furthermore, the control unit 20 controls the liquid crystal display 13 in order to display the emphasis information with the emphasized luminance and in order to display the normal information with the normal luminance.

FIG. 3 illustrates the screen luminance level VB that is realized in accordance with the adjustment value ST. The user operates the adjustment unit 21 in the assumption that the screen luminance level VB proportionally changes as shown in FIG. 3. The adjustment value ST gradually changes within a changeable range VR. The screen luminance level VB changes directly proportionally to the change (increase and decrease) of the adjustment value ST. A normal luminance level VBo used for displaying the normal information is proportional to the adjustment value ST and has a linear characteristic. For example, the screen luminance level VB is indicated as a percentage of the screen luminance relatively defined between the first luminance and the second luminance when the screen luminance is adjustable between the first luminance and the second luminance.

An emphasis luminance level VBe used for displaying the emphasis information is changed based on a bent line characteristic. For example, the emphasis luminance level VBe starts changing by a different rate as a function of the adjustment value ST when the adjustment value ST becomes a predetermined mid-value STm that is positioned within the changeable range VR. As a result, the emphasis luminance level VBe draws a line chart. More specifically, the emphasis luminance level VBe changes proportionally to the adjustment value ST when the adjustment value ST is equal to or greater than the predetermined mid-value STm. For example, when the adjustment value ST is equal to or greater than the mid-value STm, the emphasis luminance level VBe is identical with the normal luminance level VBo. The above similarity is made because the high luminance for the emphasis information may not sufficiently catches the attention of the user under a specific condition, where the average luminance over the liquid crystal display 13 is relatively high. In contrast, when the adjustment value ST is less than the predetermined mid-value STm, the emphasis luminance level VBe is maintained at a constant value regardless of the adjustment value ST. As above, when the adjustment value ST is less than the mid-value STm, the emphasis luminance level VBe is greater than the normal luminance level VBo such that the emphasis information displayed with the emphasis luminance level VBe is brighter than the normal information displayed with the normal luminance level VBo. As a result, the difference is provided between the display with the normal luminance level VBo and the display with the emphasis luminance level VBe, and thereby the emphasis information is sufficiently emphasized or highlighted. More specifically, when the average screen luminance level of the liquid crystal element is relatively low, the emphasized display is effectively provided.

The control unit 20 includes a light source control unit 23 that controls the luminance of the backlight 14. For example, the light source control unit 23 adjusts the luminance of the backlight 14. The luminance of the backlight 14 is continuously or stepwisely adjusted between the first luminance and the second luminance. The luminance of the backlight 14 is indicated as the light source luminance level BL. For example, the light source luminance level BL is indicated as a percentage of the light source luminance relatively defined between the first luminance and the second luminance. The light source control unit 23 includes a storage unit 24 that stores a predetermined luminance characteristic. The luminance characteristic is set such that the light source luminance level BL is set in accordance with the adjustment value ST. The light source control unit 23 determines the light source luminance level BL based on the luminance characteristic and the adjustment value ST, and includes a drive unit 25 that drives the backlight 14 such that the backlight 14 provides light of the light source luminance level BL.

The storage unit 24 stores the luminance characteristic shown in FIG. 4. The relation between the light source luminance level BL and the adjustment value ST is indicated by a straight line. In other words, the light source luminance level BL is linearly proportional to the adjustment value ST, for example. The light source luminance level BL gradually changes with the change (increase and decrease) of the adjustment value ST within an entirety of a changeable range VR of the adjustment value ST. It is designed that the light source luminance level BL gradually changes with the change of the adjustment value ST around the mid-value STm.

The control unit 20 further includes a liquid crystal control unit 26 that controls the liquid crystal element 15. The liquid crystal control unit 26 generates a drive signal for each pixel of the liquid crystal element 15 such that the information sets obtained through the multiple sensors 22 are displayed on the liquid crystal display 13. Furthermore, the liquid crystal control unit 26 controls a tone of each pixel of the liquid crystal element 15. The tone of each pixel of the liquid crystal element 15 is continuously or stepwisely adjustable between the first tone and the second tone. The tone of each pixel of the liquid crystal element 15 is indicated as the liquid crystal tone level GL. For example, the liquid crystal tone level GL is indicated as a percentage of the liquid crystal tone relatively defined between the first tone and the second tone. The liquid crystal control unit 26 includes storage units 27, 28 that stores predetermined tone characteristics. The tone characteristic is designed such that the liquid crystal tone level GL is determined in accordance with the adjustment value ST. The first storage unit 27 stores a normal tone level GLo for the normal display. The second storage unit 28 stores an emphasis tone level GLe for the emphasized display. The liquid crystal control unit 26 includes drive unit 29 that determines the emphasis tone level GLe and the normal tone level GLo in accordance with the respective tone characteristics and the adjustment value ST. Then, the drive unit 29 operates each pixel of the liquid crystal element 15 in order to provide the determined tone levels.

The tone characteristics shown in FIG. 5 are respectively stored in the first storage unit 27 and the second storage unit 28. The normal tone level GLo is set such that the normal luminance level VBo for displaying the normal information is achieved. The emphasis tone level GLe is set such that the emphasis luminance level VBe for displaying the emphasis information is achieved.

The normal tone level GLo is stored in the first storage unit 27. The normal tone level GLo is linearly proportional to the adjustment value ST. The characteristic of the normal tone level GLo is determined such that the normal tone level GLo gradually changes with the change of the adjustment value ST within the entirety of the changeable range VR of the adjustment value ST.

The emphasis tone level GLe is stored in the second storage unit 28. The emphasis luminance level VBe used for displaying the emphasis information is changed based on the bent line characteristic. When the adjustment value ST is equal to or greater than the mid-value STm, the emphasis tone level GLe increases with the increase of the adjustment value ST. When the adjustment value ST is equal to or greater than the mid-value STm, the emphasis tone level GLe is identical with the normal tone level GLo. In contrast, when the adjustment value ST is less than the mid-value STm, the emphasis tone level GLe decreases with the increase of the adjustment value ST. When the adjustment value ST is less than the mid-value STm, the display with the emphasis tone level GLe is brighter than the display with the normal tone level GLo. For example, when the adjustment value ST is less than the mid-value STm, the emphasis tone level GLe decreases with the increase of the adjustment value ST as shown in FIG. 5 such that the emphasis luminance level VBe is maintained at a constant value as shown in FIG. 3. More specifically, when the adjustment value ST is less than the mid-value STm, the increase of the light source luminance level BL is offset by the decrease of the emphasis tone level GLe in order to decrease a quantity of light that passes through the liquid crystal element 15. The emphasis tone level GLe gradually changes with the change of the adjustment value ST within the entirety of the changeable range VR of the adjustment value ST. The luminosity or brightness provided by the emphasis tone level GLe is equal to or greater than the luminosity provided by the normal tone level GLo within the entirety of the changeable range VR.

When the vehicular display system 1 is provided with power, the liquid crystal control unit 26 causes the liquid crystal display 13 to display the information obtained through the multiple sensors 22. In the above, the backlight 14 is controlled based on the light source luminance level BL shown in FIG. 4, and the liquid crystal element 15 is controlled based on the liquid crystal tone level GL shown in FIG. 5 such that the screen luminance level VB (VBo or VBe) shown in FIG. 3 is achieved. The adjustment unit 21 adjusts the adjustment value ST. The light source control unit 23 operates the backlight 14 such that the backlight 14 provides light of the light source luminance level BL in accordance with the adjustment value ST. The liquid crystal control unit 26 operates multiple pixels of the first segment 16 at the normal tone level GLo that is determined in accordance with the adjustment value ST. Simultaneously, the liquid crystal control unit 26 operates the multiple pixels of the second and third segments 17, 18 at the emphasis tone level GLe that is determined in accordance with the adjustment value ST. The emphasis tone level GLe corresponds to brightness equal to or greater than brightness of the normal tone level GLo. The emphasis luminance level VBe provided based on the emphasis tone level GLe corresponds to brightness equal to or greater than brightness of the normal luminance level VBo provided based on the normal tone level GLo. As a result, the information on the first segment 16 of the liquid crystal display 13 is displayed with the normal luminance level VBo, and the information sets on the second and third segments 17, 18 are displayed with the emphasis luminance level VBe.

When the user operates the adjustment unit 21, the adjustment value ST changes, and accordingly, both of the light source luminance level BL and the liquid crystal tone level GL gradually change with the change of the adjustment value ST. In the above case, both of the emphasis tone level GLe and the normal tone level GLo gradually change with the change of the adjustment value ST. As a result, the screen luminance level VB changes between the first luminance and the second luminance in accordance with the change of the adjustment value ST. For example, the first luminance corresponds to the darkest level, and the second luminance corresponds to the brightest level. Furthermore, even when the normal luminance level VBo decreases to become equal to or less than a predetermined luminance level that corresponds to the mid-value STm, the luminosity achieved by the emphasis luminance level VBe is maintained greater than the luminosity achieved by the normal luminance level VBo.

In the present embodiment, the light source luminance level BL and the liquid crystal tone level GL are set such that the desired screen luminance level VB is obtainable. Furthermore, both of the light source luminance level BL and the liquid crystal tone level GL gradually changes with the change of the adjustment value ST within the entirety of the changeable range VR of the adjustment value ST. In other words, both of the light source luminance level BL and the liquid crystal tone level GL continuously changes with the change (increase and decrease) of the adjustment value ST within the entirety of the changeable range VR of the adjustment value ST. More specifically, both of the luminance level BL and the tone level GL are changed based on the adjustment value ST without maintaining any one of the luminance level BL and the tone level GL at a constant value. As a result, the screen luminance level VB changes within the entirety of the changeable range VR of the adjustment value ST. Furthermore, while changing the normal luminance level VBo for displaying the normal information based on the adjustment value ST, the emphasis luminance level VBe for displaying the emphasis information is maintained to correspond to the brightness equal to or higher than the brightness of the normal luminance level VBo. As a result, it is capable of displaying the emphasis information in a highlighted manner in order to effectively catch the attention of the user.

Second Embodiment

Figure 6:
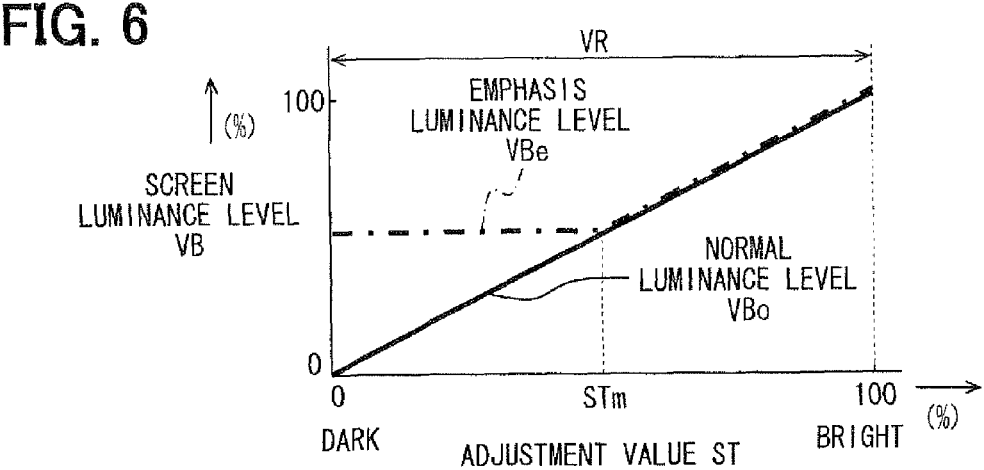
FIG. 6 is a chart illustrating a relation between the screen luminance level VB and the adjustment value ST in the second embodiment of the present invention.
Figure 7:
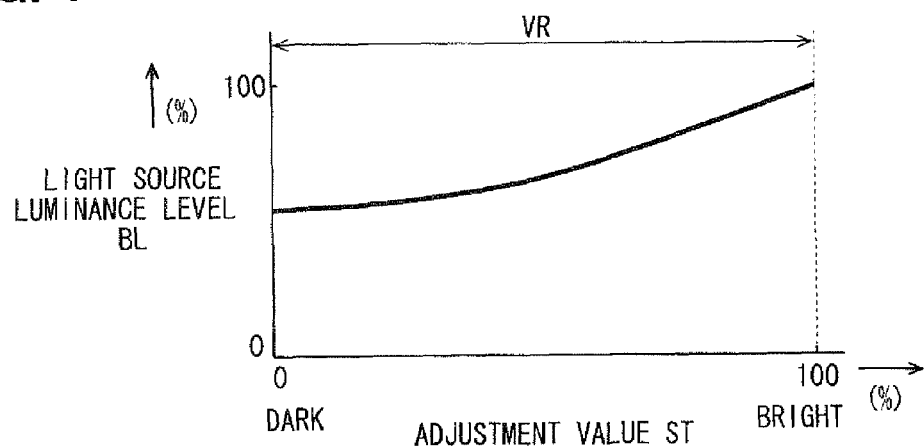
FIG. 7 is a chart illustrating a luminance characteristic between the light source luminance level BL and the adjustment value ST in the second embodiment.
Figure 8:
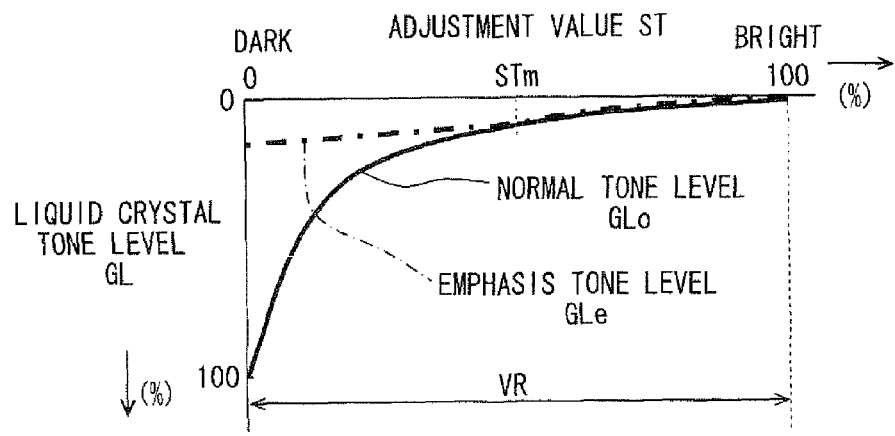
FIG. 8 is chart illustrating a tone characteristic between the liquid crystal tone level GL and the adjustment value ST in the second embodiment.

The second embodiment of the present invention has characteristics shown in FIGS. 6 to 8 instead of the characteristics of FIGS. 3 to 5 of the first embodiment. The vehicular display system of the present embodiment is shown in FIGS. 1 and 2, and has the configuration described in the first embodiment. FIG. 6 is identical with FIG. 3. The characteristics of the emphasis luminance level VBe and the normal luminance level VBo in FIG. 6 are achieved by the characteristics of FIGS. 7 and 8.

The relation between the light source luminance level BL and the adjustment value ST shown in FIG. 7 is associated with a curved line relation. In other words, the above relation generally draws a quadratic curve when expressed in a two-dimensional diagram of the luminance level BL and the adjustment value ST, and, for example, the quadratic curve may be a part of a parabola. The light source luminance level BL gradually changes with the change of the adjustment value ST within the entirety of the changeable range VR.

The relation between the normal tone level GLo and the adjustment value ST shown in FIG. 8 is associated with a curved line relation. In other words, the above relation generally draws another quadratic curve when expressed in a two-dimensional diagram of the tone level GLo and the adjustment value ST, and, for example, the quadratic curve may be a part of a parabola. The normal tone level GLo gradually changes with the change of the adjustment value ST within the entirety of the changeable range VR. The relation between the emphasis tone level GLe and the adjustment value ST shown in FIG. 8 is also associated with a curved line relation. In other words, the above relation generally draws still another quadratic curve when expressed in a two-dimensional diagram of the tone level GLe and the adjustment value ST, and, for example, the quadratic curve may be a part of a parabola. The emphasis tone level GLe is substantially identical with the normal tone level GLo when the adjustment value ST is equal to or greater than the mid-value STm. The emphasis tone level GLe slightly changes with a small change rate when the adjustment value ST is less than the mid-value STm. The emphasis tone level GLe gradually changes with the change of the adjustment value ST within the entirety of the changeable range VR.

In the present embodiment, while changing the normal luminance level VBo for displaying the normal information based on the adjustment value ST, the emphasis luminance level VBe for displaying the emphasis information is maintained at a level that corresponds to luminance higher than luminance of the normal luminance level VBo.

Third Embodiment

Figure 9:
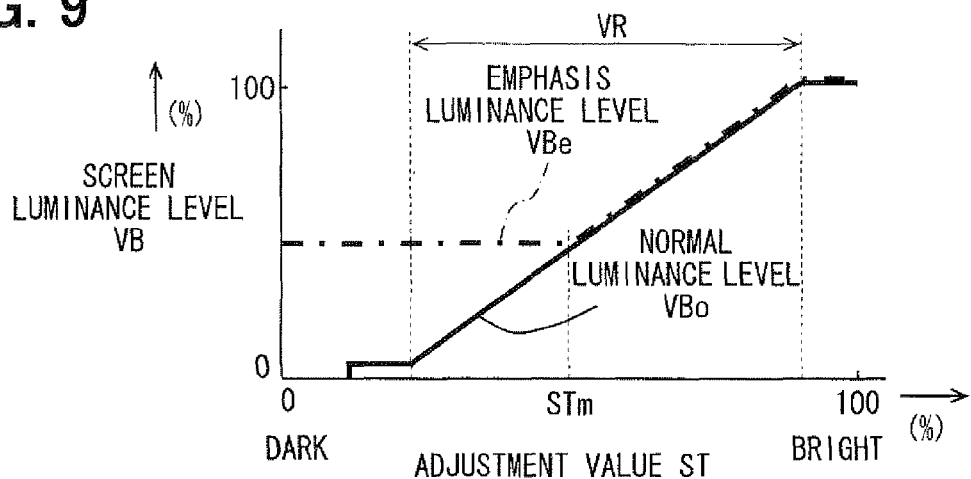
FIG. 9 is a chart illustrating a relation between the screen luminance level VB and the adjustment value ST in the third embodiment of the present invention.
Figure 10:
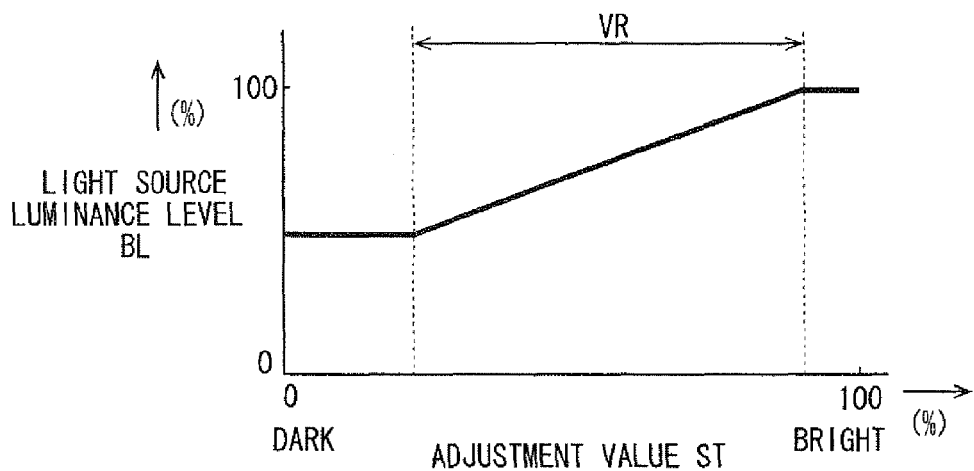
FIG. 10 is a chart illustrating a luminance characteristic between the light source luminance level BL and the adjustment value ST in the third embodiment.
Figure 11:
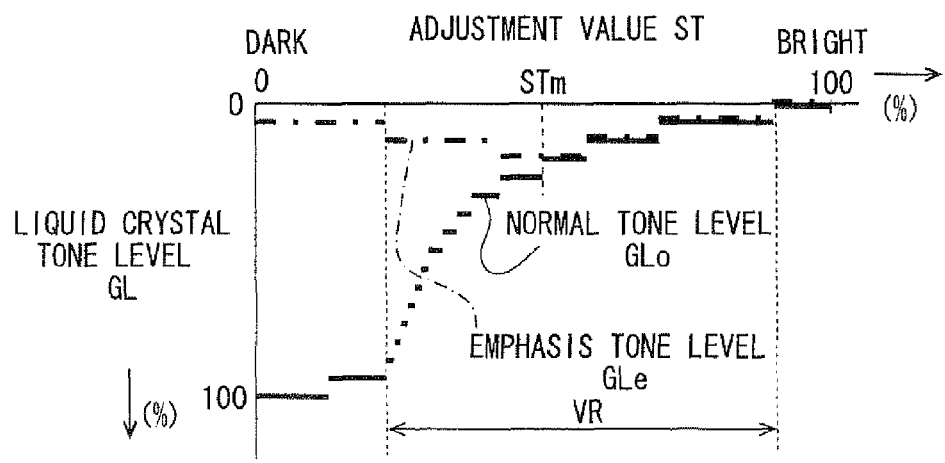
FIG. 11 is a chart illustrating a tone characteristic between the liquid crystal tone level GL and the adjustment value ST in the third embodiment.

The third embodiment of the present invention employs characteristics shown in FIGS. 9 to 11 instead of the characteristics shown in FIGS. 6 to 8. A vehicular display system of the present embodiment has the configuration described in the first and second embodiments as shown in FIGS. 1 and 2.

As shown in FIG. 9, there is a dead zone at both end ranges (maximum and minimum sides) of the adjustment value ST. More specifically, when the adjustment value ST is within the dead zone, the screen luminance level VB is maintained constant as shown in FIG. 9. There are two leveled dead zones at a lower-luminance end range of the adjustment value ST, and the two leveled dead zones corresponds to a minimum luminance level and a next minimum luminance level that is slightly higher (brighter) than the minimum luminance level. There is the other dead zone at a higher-luminance end range of the adjustment value ST, and the other dead zone corresponds to a maximum luminance level. As a result, when the adjustment value ST is within the changeable range VR of FIG. 9, the normal luminance level VBo continuously and gradually changes in accordance with the change of the adjustment value ST. The characteristics of the emphasis luminance level VBe and the normal luminance level VBo in FIG. 9 are achieved based on the characteristics shown in FIGS. 10 and 11.

The relation between the light source luminance level BL and the adjustment value ST shown in FIG. 10 draws a line chart. Alternatively, the relation between the adjustment value ST and the light source luminance level BL within the changeable range VR may be expressed as a curved line. The light source luminance level BL gradually changes with the change of the adjustment value ST within the entirety of the changeable range VR.

As shown in FIG. 11, the liquid crystal tone level GL is adjustable stepwisely at the first value, the second value, and multiple mid values defined between the first value and the second value. The first value corresponds to the darkest, and the second value corresponds to the certain level brighter than the first value. For example, the first value corresponds to the darkest screen luminance level. The second value corresponds to the brightest screen luminance level. The liquid crystal tone level GL has, for example, a resolution of 4 bits.

The relation between the normal tone level GLo and the adjustment value ST shown in FIG. 11 is associated with a curved line relation. In other words, the above relation is generally draws a quadratic curve when expressed in a two-dimensional diagram of the tone level GLo and the adjustment value ST, and, for example, the quadratic curve may be a part of a parabola. The normal tone level GLo gradually changes with the change of the adjustment value ST within the entirety of the changeable range VR.

The relation between the emphasis tone level GLe and the adjustment value ST shown in FIG. 11 is associated with a curved line relation. In other words, the above relation is generally draws a quadratic curve when expressed in a two-dimensional diagram of the tone level GLe and the adjustment value ST, and, for example, the quadratic curve may be a part of a parabola. The emphasis tone level GLe is substantially identical with the normal tone level GLo when the adjustment value ST is equal to or greater than the mid-value STm. In contrast, when the adjustment value ST is less than the mid-value STm, the emphasis tone level GLe slightly changes with a small change rate differently from the change of the tone level GLo. The emphasis tone level GLe gradually changes with the change of the adjustment value ST within the entirety of the changeable range VR.

In the present embodiment, the liquid crystal tone level GL is stepwisely set. As a result, even when the adjustment value ST changes by a certain amount, it is possible to maintain the liquid crystal tone level GL at a required level. For example, the above certain amount may corresponds to 50% or less than a dimension of the changeable range VR. More specifically, the above amount may correspond to 30% or less than the dimension of the changeable range VR. As a result, even in the configuration, where the liquid crystal tone level GL is stepwisely set, both of the light source luminance level BL and the liquid crystal tone level GL are changeable with the change of the adjustment value ST.

According to the present embodiment, while the normal luminance level VBo is changed in accordance with the adjustment value ST, it is possible to maintain the emphasis luminance level VBe higher for the brighter display than the normal luminance level VBo.

In the above embodiments, because the luminance characteristic and the tone characteristic have the straight line relation or the curved line relation, it is possible to obtain a more suitable screen luminance level by selectively using the above flexible characteristics in accordance with the operational state.

In the above embodiments, the normal tone level GLo and the emphasis tone level GLe continuously or stepwisely changes based on the tone characteristics. As a result, continuous control by using the analog electric circuit is achievable. Also, fine step control with generally continuous adjustment by using the digital electric circuit having substantially high resolution is achievable. Further, step control by using the other digital electric circuit having relatively low resolution is achievable.

Other Embodiment

The present invention is not technically limited to the above embodiments. The above embodiments may be modified in various manners for improvement or for expansion within the technical range of the present invention. For example, the luminance characteristic and the tone characteristic may employ curves different from those in the above embodiments. Also, alternatively, the storage unit 24, the first storage unit 27, and the second storage unit 28 may be replaced by a single storage device.

Additional advantages and modifications will readily occur to those skilled in the art. The invention in its broader terms is therefore not limited to the specific details, representative apparatus, and illustrative examples shown and described.

What is claimed is:
1. A display system comprising:
   a liquid crystal element that has a plurality of pixels, wherein:
      a tone level of each of the plurality of pixels is adaptable;
      a first plurality of pixels of the plurality of pixels displays normal information; and
      a second plurality of pixels of the plurality of pixels displays emphasis information;
   a backlight that provides light toward the liquid crystal element, wherein a light source luminance level of light provided by the backlight is adjustable;
   an adjustment unit that sets an adjustment value;

a light source control unit that operates the backlight to change the light source luminance level; and a liquid crystal control unit that operates the first plurality of pixels to display the normal information with the tone level of a normal tone level, wherein the liquid crystal control unit operates the second plurality of pixels to display the emphasis information with the tone level of an emphasis tone level, wherein:

when the adjustment value changes within an entirety of a predetermined changeable range of the adjustment value, the light source control unit operates the backlight such that the light source luminance level gradually changes with a change of the adjustment value; and when the adjustment value changes within the entirety of the changeable range, the liquid crystal control unit operates the first and second plurality of pixels such that the normal tone level gradually changes with the change of the adjustment value and simultaneously the emphasis tone level is maintained to correspond to brightness equal to or greater than brightness provided by the normal tone level.

2. The display system according to claim 1, wherein:
the liquid crystal control unit operates the first and second plurality of pixels such that the emphasis tone level gradually changes with the change of the adjustment value while the brightness provided by the emphasis tone level is maintained to be equal to or greater than the brightness provided by the normal tone level.

3. The display system according to claim 2, wherein:
the light source control unit operates the backlight such that the light source luminance level gradually changes with the change of the adjustment value when the adjustment value is around a predetermined mid-value;

the liquid crystal control unit operates the first and second plurality of pixels such that the emphasis tone level is similar to the normal tone level when the adjustment value is equal to or greater than the predetermined mid-value; and the liquid crystal control unit operates the first and second plurality of pixels such that the brightness provided by the emphasis tone level is greater than the brightness provided by the normal tone level when the adjustment value is less than the predetermined mid-value.

4. The display system according to claim 1, wherein:
a relation between the adjustment value and the light source luminance level is predetermined as a luminance characteristic; and a relation between the adjustment value and the tone level of each of the plurality of pixels is predetermined as a tone characteristic, the display system further comprising:

a storage unit that stores the luminance characteristic and the tone characteristic.

5. The display system according to claim 4, wherein:
each of the luminance characteristic and the tone characteristic is expressed as a straight line or a curved line.

6. The display system according to claim 1, wherein the liquid crystal control unit operates the first and second plurality of pixels such that the normal tone level and the emphasis tone level continuously or stepwisely change.

* * * * *